(12) United States Patent
Cantwell et al.

(10) Patent No.: US 6,493,346 B1
(45) Date of Patent: Dec. 10, 2002

(54) SYSTEM FOR PROVIDING CONVERSION OF TDM-BASED FRAME RELAY DATA IN A CROSS-CONNECT MATRIX TO AND FROM ATM DATA

(75) Inventors: Robert Cantwell, Lucas, TX (US); Clay Potter, Corinth, TX (US); Mike Plummer, Santa Rosa, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/282,894

(22) Filed: Mar. 31, 1999

(51) Int. Cl.[7] .......................... H04L 12/28; G01R 31/08
(52) U.S. Cl. ................... 370/395.63; 370/217; 370/466
(58) Field of Search ............................ 370/351, 352–3, 370/357–360, 369–381, 395.1, 395.63, 216–220, 242, 244, 248; 340/825, 2.2

(56) References Cited

U.S. PATENT DOCUMENTS 6,222,843 B1 * 4/2001 Mauger ..................... 370/397
6,304,639 B1 * 10/2001 Malomsoky et al. .. 379/112.04
6,385,196 B1 * 5/2002 Hayball et al. ............. 370/356

OTHER PUBLICATIONS

*A Highly Reliable Frame–Relay Switching Node Architecture Based on ATM Switching Technology*, by Kiyoshiro Noguchi, Yumiko Kawashima and Shinya Narita; IEICE Transactions on Communications, JP, Institute of Electronics Information and Comm. Eng. Tokyo, vol. E81–B, No. 2, Feb. 1, 1998, pp. 315–323.

* cited by examiner

*Primary Examiner*—David Vincent
(74) *Attorney, Agent, or Firm*—Locke, Liddell & Sapp, LLP; V. Lawrence Sewell; Jessica W. Smith (57) ABSTRACT

A high density frame relay circuit within a digital cross-connect matrix converts TDM based DCS matrix data containing frame relay data to/from a DS3 ATM physical interface and provides adaption processing between the frame relay and ATM domains. The circuit is controlled by a DCS administrative subsystem and a simple network management protocol based network element manager.

9 Claims, 11 Drawing Sheets

SYSTEM FOR PROVIDING CONVERSION OF TDM-BASED FRAME RELAY DATA IN A CROSS-CONNECT MATRIX TO AND FROM ATM DATA

TECHNICAL FIELD OF THE INVENTION

The present invention relates to telecommunications systems, and more particularly to a system for converting TDM-based digital cross-connect system matrix data containing frame relay data to and from ATM data.

BACKGROUND OF THE INVENTION

Digital cross-connect systems (DCS) constitute switching/multiplex equipment that permit per-channel DS0 electronic cross-connection from one T1 transmission facilities to another, directly from the constituent DS1 signals. A basic multiplexing method used in telecommunications digital cross-connect systems is time division multiplexing (TDM). In TDM, a transmission facility is shared in time rather than frequency. In a TDM system, a frame is a sequence of time slots, each containing a sample from one of the channels served by the multiplex system. The frame is repeated at the sampling rate, and each channel occupies the same sequence position in successive frames. To permit higher levels of multiplexing concentration, a multi-level TDM digital signal hierarchy has been developed.

The DS1 level in the hierarchy corresponds to the 1.544 Mbps TDM signal. The DS0 level refers to the individual time slot digital signals at channel rates of 64 kbps. Four DS1 signals comprise a DS2 level signal containing 96 DS0 channels. A DS3 level signal results from the digital multiplexing of seven DS2 signals. The DS designation refers to the signal level hierarchy and is independent of the type of carrier facility.

Frame relay is a high-speed switching technology utilized in a form of packet switching. The packets are in the form of "frames" which are variable in length. A frame relay network can accommodate data packets of various sizes associated with virtually any native data protocol.

Asynchronous transfer mode (ATM) is a high speed transmission technology utilizing a high bandwidth, low-delay, connection-oriented, packet-like switching and multiplexing technique. ATM allocates bandwidth on demand, making it suitable for high speed connection of voice, data, and video services.

In telecommunications systems, digital cross-connect systems are required to convert TDM based matrix data containing frame relay data to and from DS3 ATM data. Typically, equipment is separate from the cross-connect system that performs TDM-frame relay and frame-relay ATM conversion. Such equipment requires additional rack and bay locations from the digital cross-connect system as well as additional interfaces.

To improve the efficiency in telecommunications systems as well as to provide economical systems it is desirable to include additional functions within a digital cross-connect system. A need has thus arisen for a system to extract frame relay data from TDM data at a narrow band cross-connect switching matrix to perform conversion of the frame relay data to/from a DS3 ATM interface and perform adaption processing between the frame relay and ATM domains in a narrow band cross-connect system.

SUMMARY OF THE INVENTION

The present invention provides for a high density frame relay circuit pack to be installed in a subsystem of a digital cross-connect system. The frame relay circuit pack converts TDM based data containing frame relay data to/from a DS3 ATM physical interface and performs adaption processing between the frame relay and ATM domains. The frame relay circuit pack converts DS0 channelized and DS1 unchannelized frame relay traffic to DS3 ATM data in the outbound direction and converts DS3 ATM traffic to DS0 channelized or DS1 unchannelized frame relay data in the inbound direction.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
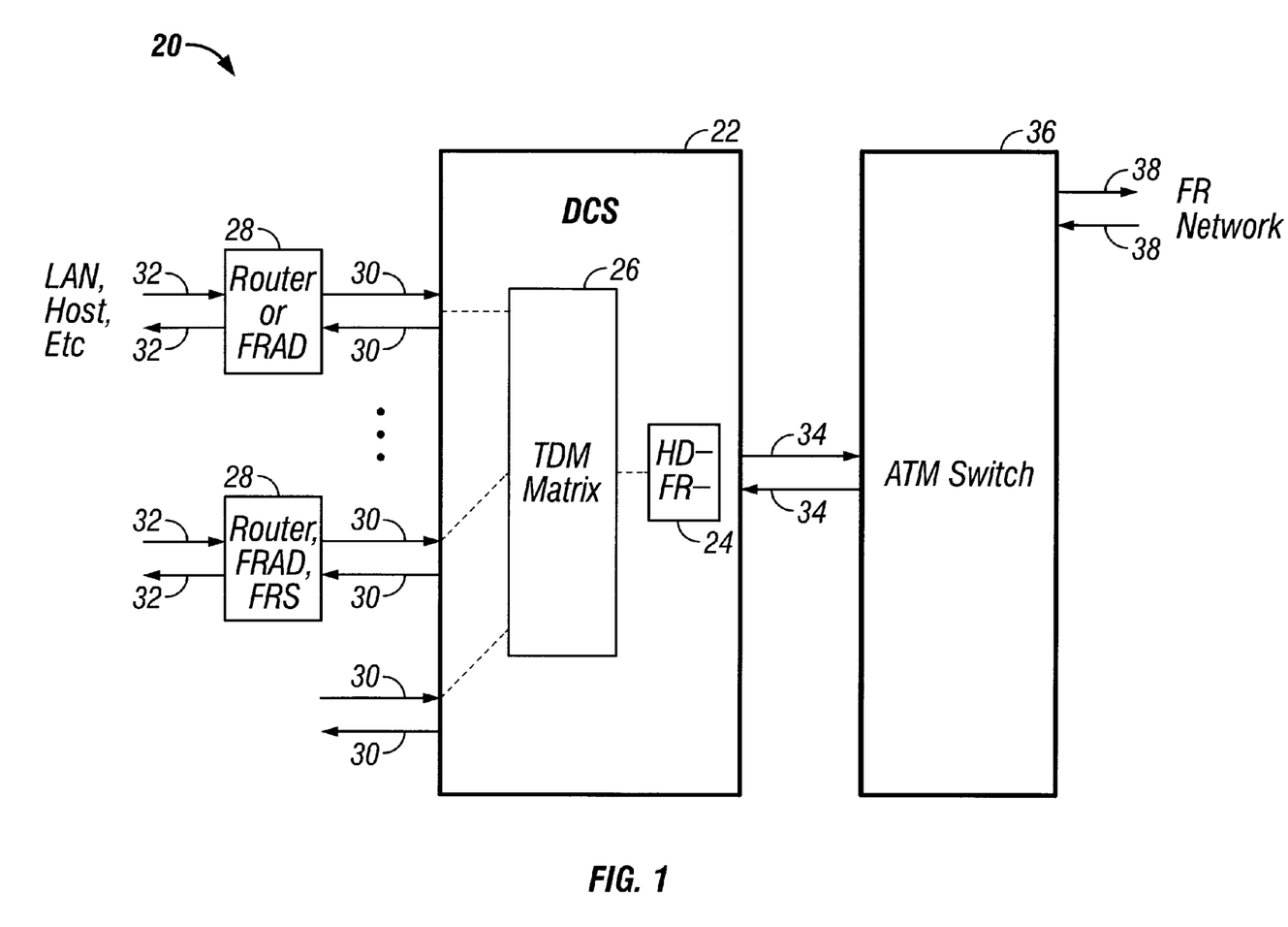
FIG. 1 is a block diagram of the present telecommunications system including a digital cross-connect system and the present frame relay circuit.

Referring to FIG. 1, a block diagram of the present telecommunications system, generally identified by the numeral 20 is illustrated. System 20 includes a digital cross-connect system (DCS) 22 and the present frame relay (FR) circuit 24. DCS 22 includes a TDM matrix 26. DCS 22 performs switching on time division multiplex traffic and provides access to frame relay 24 and asynchronous transfer mode services. DCS 22 may include, for example, a narrow band, tandem switch, or broad band cross-connect system.

TDM matrix 26 is connected to multiple routers, frame relay access devices (FRAD) 28 and frame relay service (FRS) 28 and communicates with these devices over T1 or E1 links 30. Router or FRAD 28 is interconnected to a local area network, or host over link 32, and converts internet protocol, and system network architecture data to and from frame relay data. Such conversion consists of adding data link connection identifiers (DLCI) address, frame check sequence, and other frame relay overhead. Links 30 carry DS1, E1 or DS3 with DS0, nXDS0, or DS1/E1 unchannelized frame relay TDM traffic.

DCS 22 grooms DS0s and increases utilization of DCS 22 TDM bandwidth, permanent virtual circuit throughput, and reduces port cost on frame relay switch 24. The output of frame relay circuit 24 represents DS3 ATM data transmitted over link 34 to an ATM relay switch 36. ATM relay switch 36 transmits ATM data over link 38 to a frame relay network including, for example, a DS1 trunk to/from another frame relay switch or to/from an end point frame relay access device router. An important aspect of the present invention is the use of frame relay circuit 24 installed within the subsystem of DCS 22.

Figure 2:
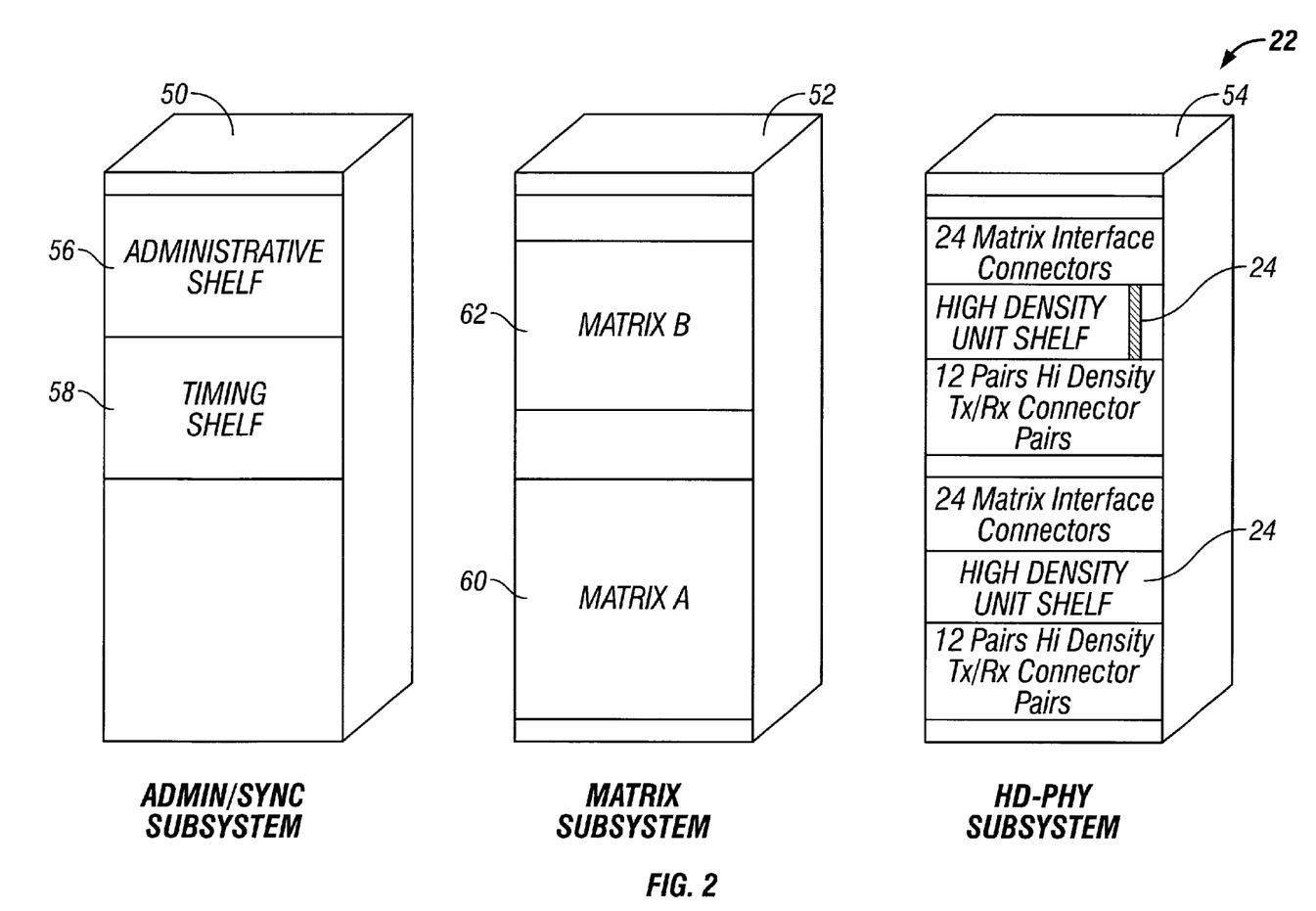
FIG. 2 is a pictorial illustration of a telecommunications system showing the physical placement of equipment.

The present frame relay circuit 24 is installed in a high density unit shelf of an equipment bay equipment rack. As illustrated in FIG. 2, DCS 22 includes an administrative bay 50, a matrix 26, bay 52, and a high density physical interface bay 54. Bay 50 houses an administrative shelf 56 and a timing shelf 58. Matrix subsystem bay 52 houses matrices A and B, 60 and 62. High density relay circuits 24 are housed within bay 54 and includes, for example, up to 24 circuits 24 that may be installed within a unit shelf in a 1:1 sparing configuration. In the unprotected configuration 12, circuits 24 are installed, alternating one circuit 24 and one blank circuit pack for the twenty-four slots in a shelf. An extended back plane is used with matrix interface cables meeting above the card cage and network interface of the lower portion of the back plane.

Figure 3:
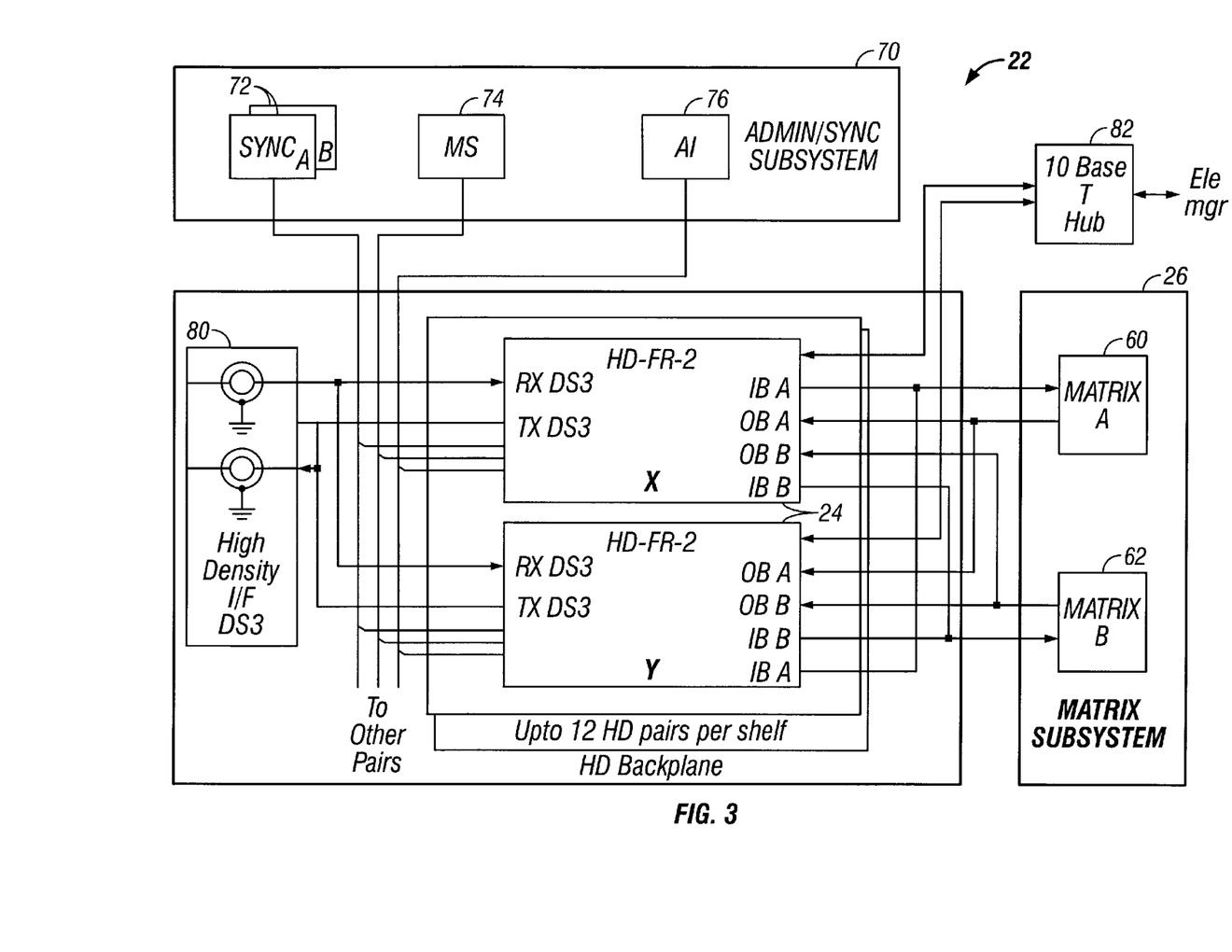
FIG. 3 is a block diagram of the present telecommunications system illustrating a redundant frame relay circuit.

FIG. 3 illustrates the architectural position of the present frame relay circuit 24 within DCS 22. DCS 22 includes an administrative subsystem 70 including synchronization circuit 72, microprocessor system 74, and AI system 76. Up to, for example, twelve pairs of circuits 24 per high density physical shelf are used in the 1:1 protected mode. Up to, for example, twelve single circuits 24 per shelf are used in the unprotected configuration. The high density unit shelf allows a mix of high density T1, HD-E1, HD-DS3 and frame relay circuits 24. The administrative/time subsystem 70 provides redundant timing buses for distribution to all circuits 24 within a shelf.

A serial link between microprocessor system 74 and each circuit 24 is used for system configuration and status uploads. Each circuit 24 is interfaced to both matrices 60 and 62. In the protected mode, each matrix 60 and 62 accepts inbound data from one side of circuit 24 pair. Each circuit 24 in the pair receives outbound data from both matrices 60 and 62. The matrix plane selection is performed under control of subsystem 70 or automatically by circuit 24 should the active matrix fail. Circuits 24 are connected to a high density interface 80 which outputs DS3 data. Circuits 24 include an Ethernet port which is connected to an Ethernet hub 82 which allows each circuit 24 to communicate to each other and connect to a high level element manager.

Figure 4:
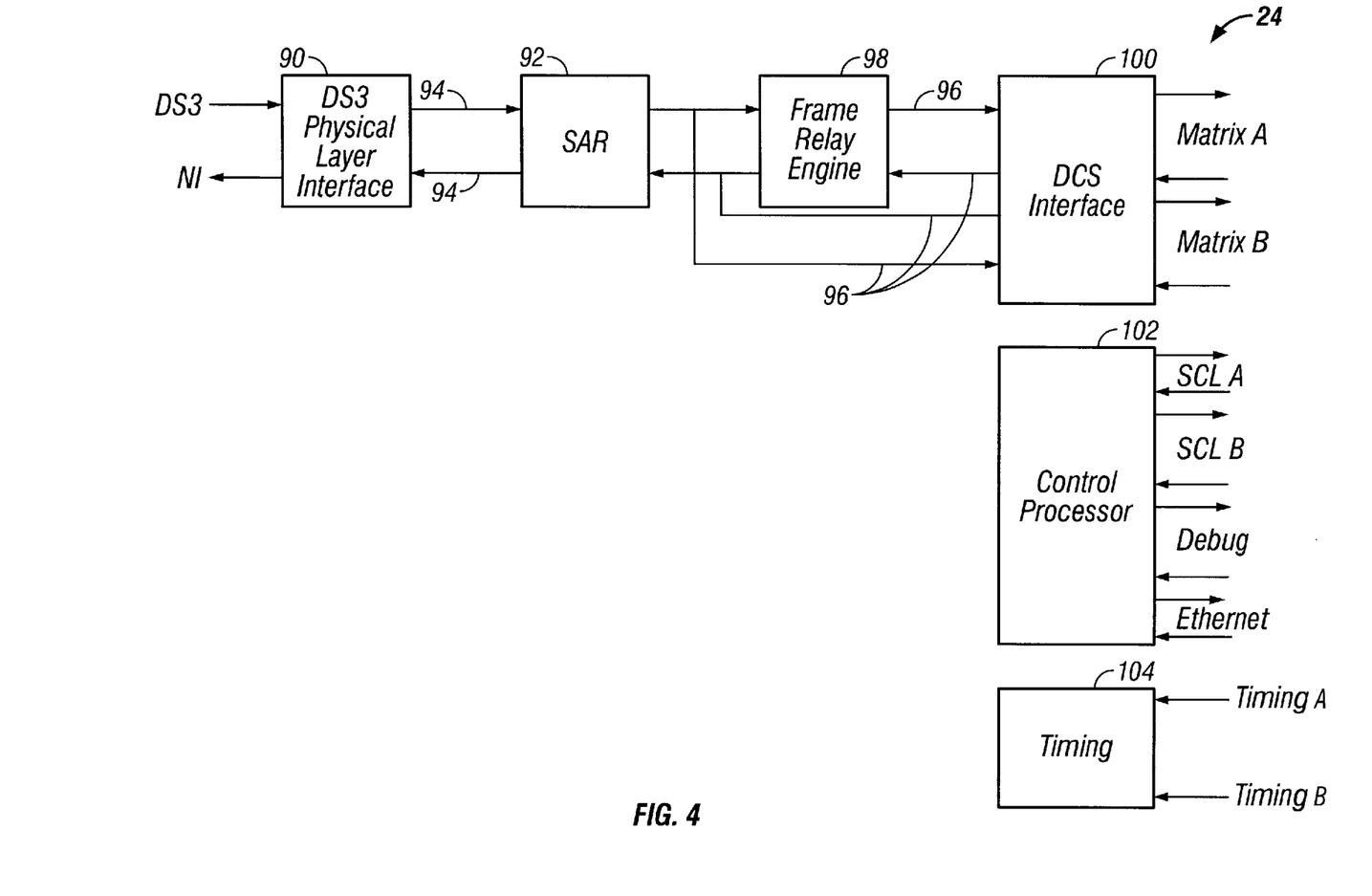
FIG. 4 is a high level block diagram of the present frame relay circuit.

Referring now to FIG. 4 which is a high level block diagram of the present frame relay circuit 24. Physical layer interface 90 performs both DS3 line level interface and ATM transmission convergence sublayer functions. Physical layer interface 90 interfaces with a segmentation and re-assembly (SAR) block 92 via an 8-bit Utopia level 1 interface 94. Block 92 performs the upper portions of the ATM layer as well as the ATM adaptation layer. SAR 92 supports AAL 0, 3/4 and 5 cell formats as well as raw cell formats. A 32 bit peripheral component interconnect (PCI) bus 96 interfaces SAR 92 to a frame relay engine 98. Frame relay engine 98 performs data link layer operations through packetize/depacketize data and performs the interworking function between frame relay and ATM.

The output of frame relay engine 98 is applied to DCS interface 100 which converts serial data from/to the 16 bit DCS format, performs fault isolation, and selects the outbound redundant matrix plane to output to the network. Control processor 102 manages and configures all blocks interfaces with DCS 22 administration subsystem 70 (FIG. 3) and provides an Ethernet interface to the element manager. Timing block 104 selects the redundant timing input, generates board level clocks and performs fault isolation of the DCS 22 timing subsystem.

FIG. 5a–5d illustrates a detailed block diagram of the present frame relay circuit 24. Frame engine 98, control processor 102, matrix interface 100, and physical layer interface 90 are illustrated, and will subsequently be described with respect to FIGS. 6–8. Physical layer interface 90 provides for DS3 line and path performance monitoring, ATM cell descrambling, vital/unassigned cell filtering, and includes four cell FIFO and sources Utopia 8 bit bus to SAR block 92. SAR block 92 reassembles convergence sublayer protocol data, writes convergence sublayer, protocol data unit (CS-PDUs) into the memory of frame relay engine 98. Additionally SAR 92 interrupts frame relay engine 98 when a complete CS-PDU is received, and interrupts frame relay engine 98 when operations administrative and maintainance (OAM) cells are received.

Frame relay engine 98 converts CS/PDUs to frame relay packets. Frame relay packets may be formatted into DS0, nXDS0 or unchannelized DS1 for a total of 672 DS0 channels. Frame engine 98 further monitors frame relay data for performance gathering, performs conversion and writes converted data via PCI bus 96 to SAR block 92.

Matrix interface 100 converts serial frame engine 98 output to 16 bit DCS matrix format and generates frame sync based on system frame sync, for time slot alignment by HDCL controller 120. Matrix interface 100 further generates inbound DCS matrix overhead and redundant (matrix A, matrix B,) data is generated. On the outbound function, matrix interface 100 selects A or B outbound matrix plane under control processor direction. Matrix interface 100 further strips off DCS overhead and converts parallel PCM data to serial for processing by frame engine 98.

Figure 5A:
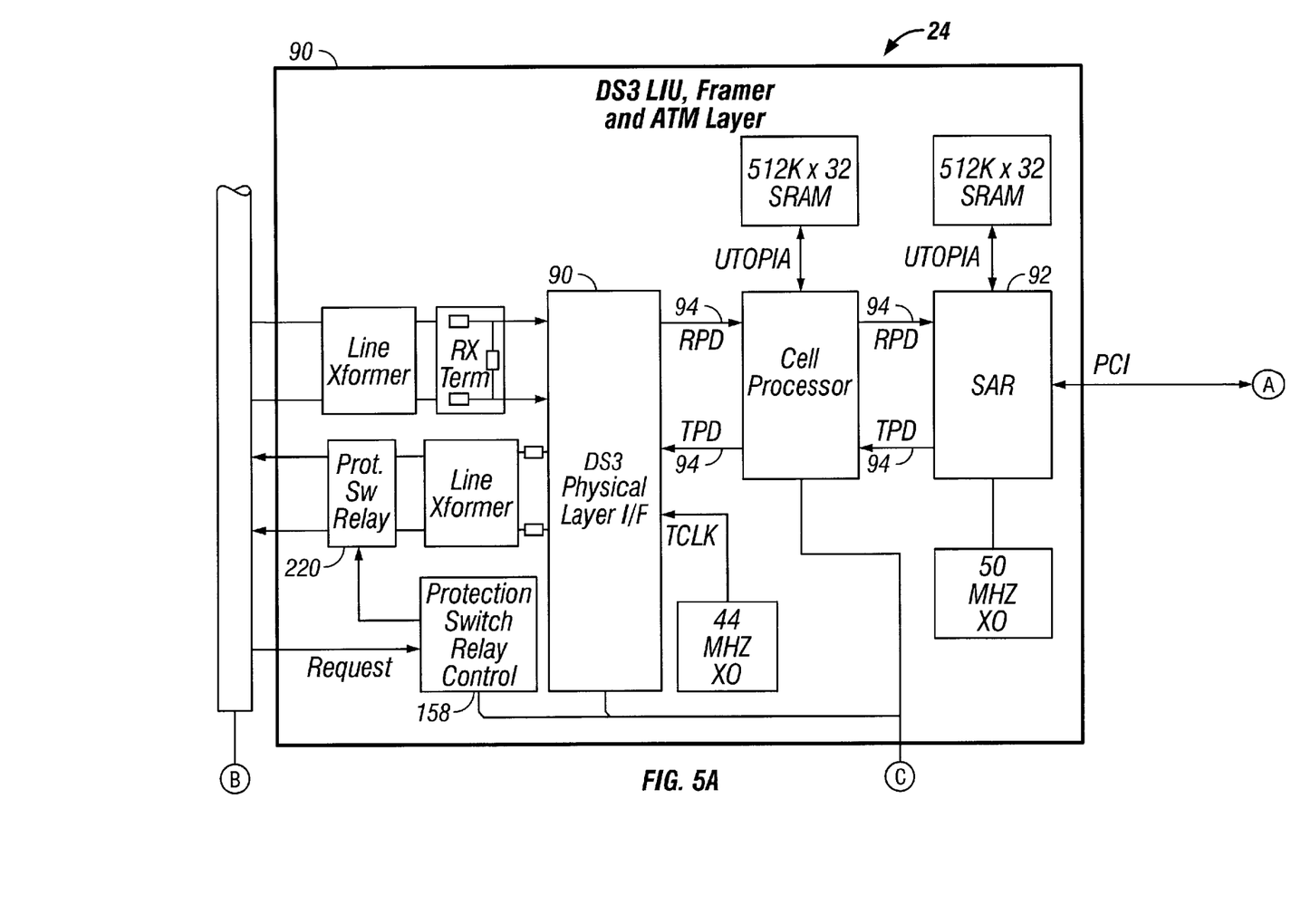
FIGS. 5a–5d is a detailed block diagram of the present frame relay circuit 24.
Figure 5B:
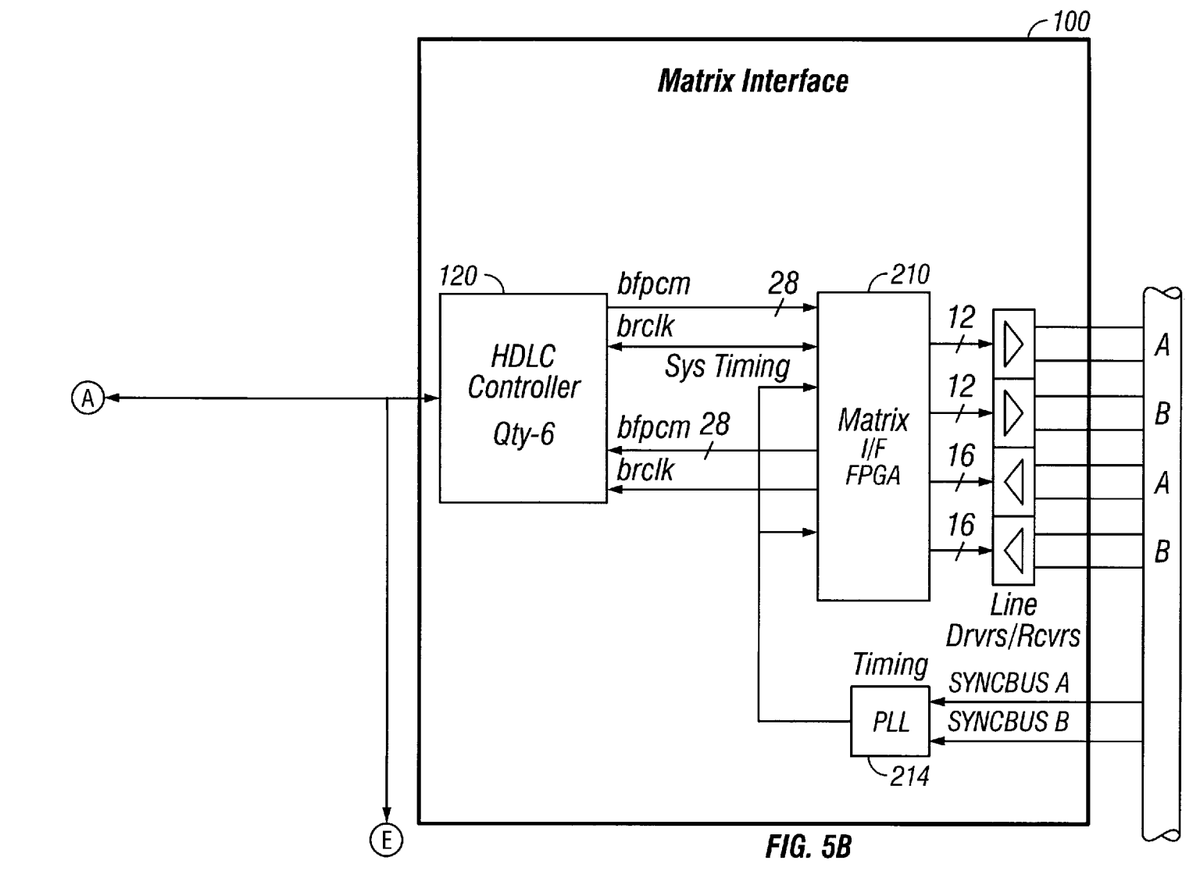
Figure 5C:
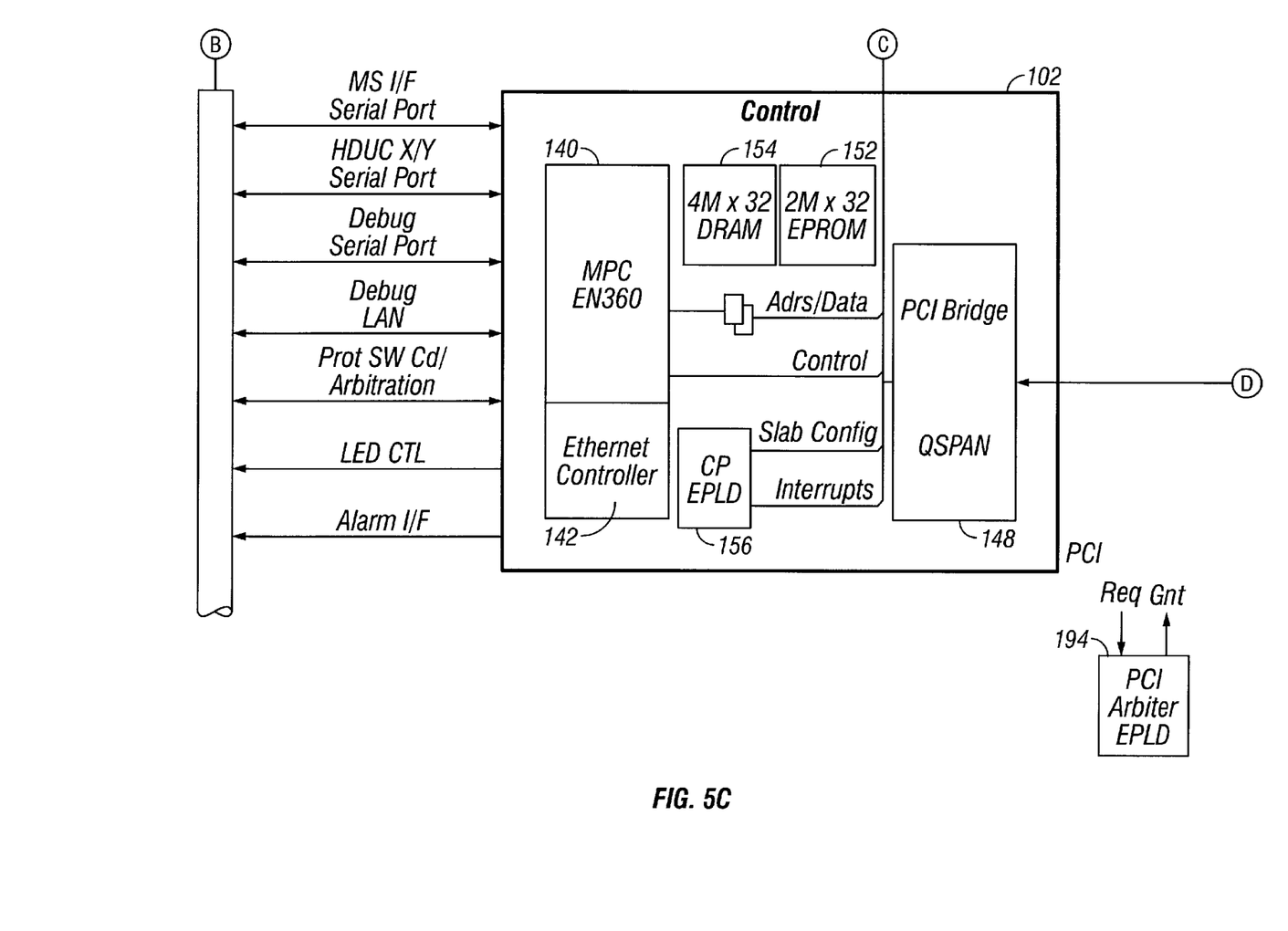

Referring simultaneously to FIGS. 5a–5d and 6, control processor 102 functions to perform board configuration, DS3 line and path performance monitoring, diagnostics, and communication with layer 90 (FIG. 5a), the companion circuit 24, simple network management protocol (SNMP) Ethernet LAN, and debug monitor. Firmware for circuit 24 is resident within control 102. Control block 102 includes a CPU 140 such as, for example, a model 68360 CPU manufactured and sold by Motorola, Inc. (FIG. 5c). CPU 140 provides seven chip selects, six serial controllers, four timers, an interrupt controller, parallel ports and memory interface/control functions. In addition, an Ethernet controller 142 is used for SNMP management port.

Figure 6:
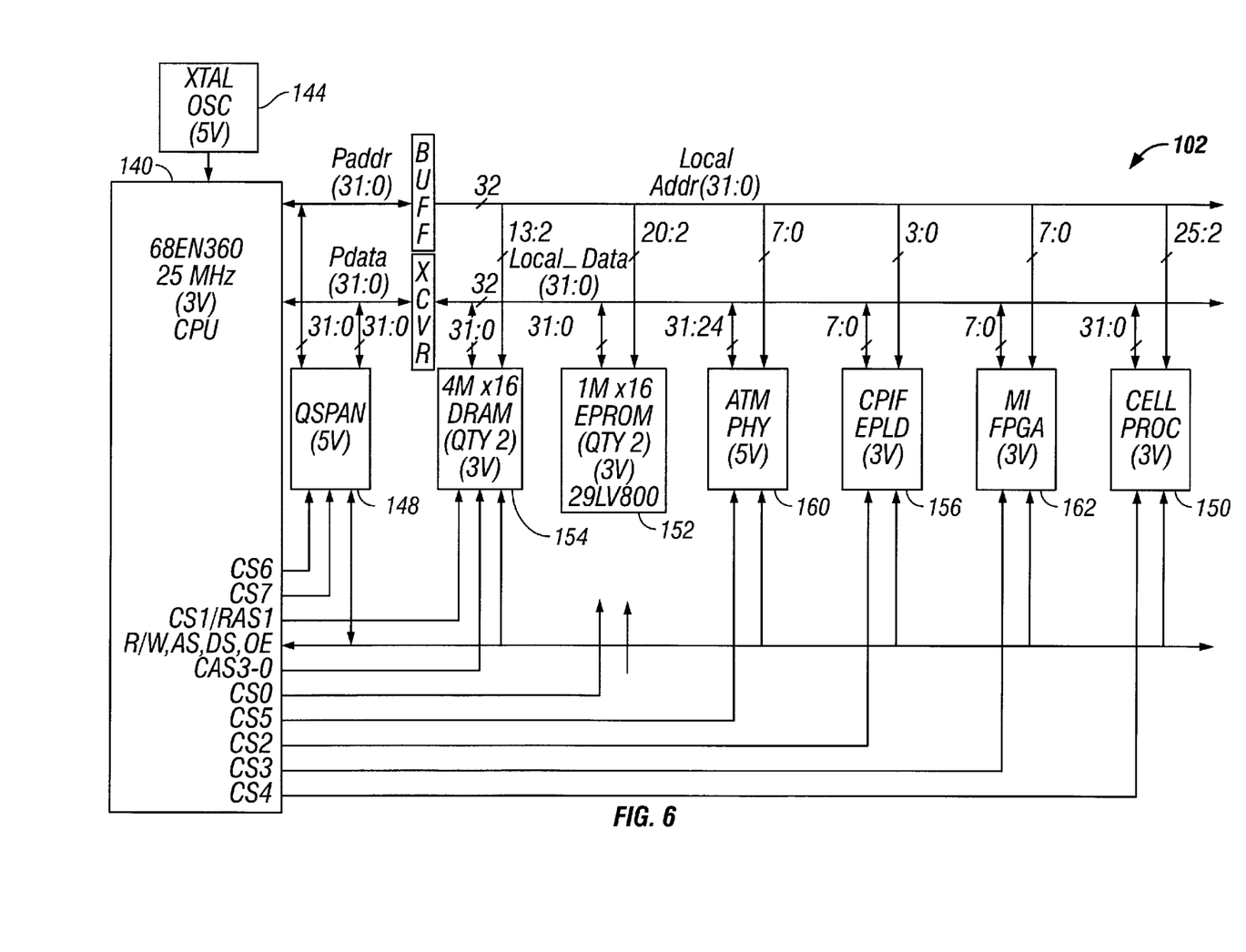
FIG. 6 is a block diagram of the present control processor block shown in FIGS. 5a–5d.

The CPU 140 processor clock is created using an external crystal oscillator 144 and the phase lock loop within CPU 140. CPU 140 has built-in chip select generation which allows the memory map to be created under firmware control. This memory controller also generates DSACK and allows for programmable insertion of wait states. DRAM refresh is generated using the CAS before RAS method and a refresh.

CPU 140 includes four internal serial communication controllers, in which channel allocation includes Ethernet controller, SCL A asynchronous mode, SCL B, asynchronous mode, and HDUC comm asynchronous mode. Channel 1 is used for the Ethernet interface port. The Ethernet port is used for both debugging purposes as well as connectivity to a local area network for element management. The serial management controller is used as a debug port which has an RS-232 interface and is accessed via the back plane. CPU 140 includes two internal direct memory access controllers, one of which is connected to QSPAN 148 and cell processor 150 (FIG. 5c).

Control block 102 includes two EPROM 152 which are connected to CS0 and only word wide access is permitted. EPROM 152 includes code for communications with administrative subsystem 70. Control block 102 further includes two DRAMS 154 which are refreshed using the CAS before RAS method. Control block 102 includes a control processor interface EPLD 156 which provides status and control registers for layer 90, protection switch relay control logic 158, SCL reset control logic, and SCL service and nonservice affecting alarm control. Control processor interface EPLD 156 controls a protection switch relay control 158 within layer 90 (FIGS. 5a–5d). Control 158 arbitrates between circuit 24 card pairs to determine which card actually drives (transmits) the DS3 network line.

Control block 102 further includes ATM PHY 160 which functions as physical layer interface 90 (FIG. 4) and MI FPGA 162 which functions to perform outbound matrix parallel data to serial conversion.

Figure 5D:
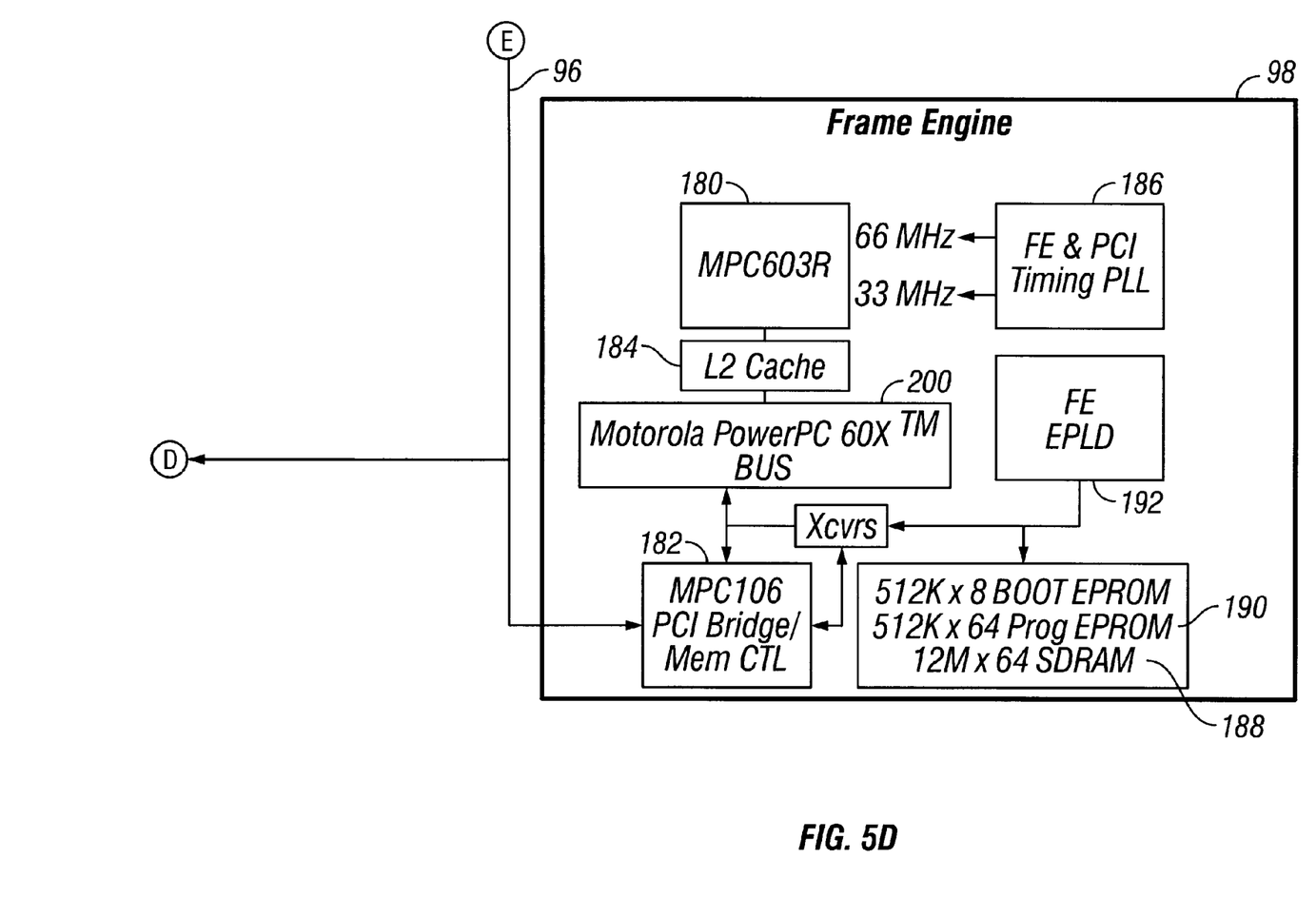
Figure 7:
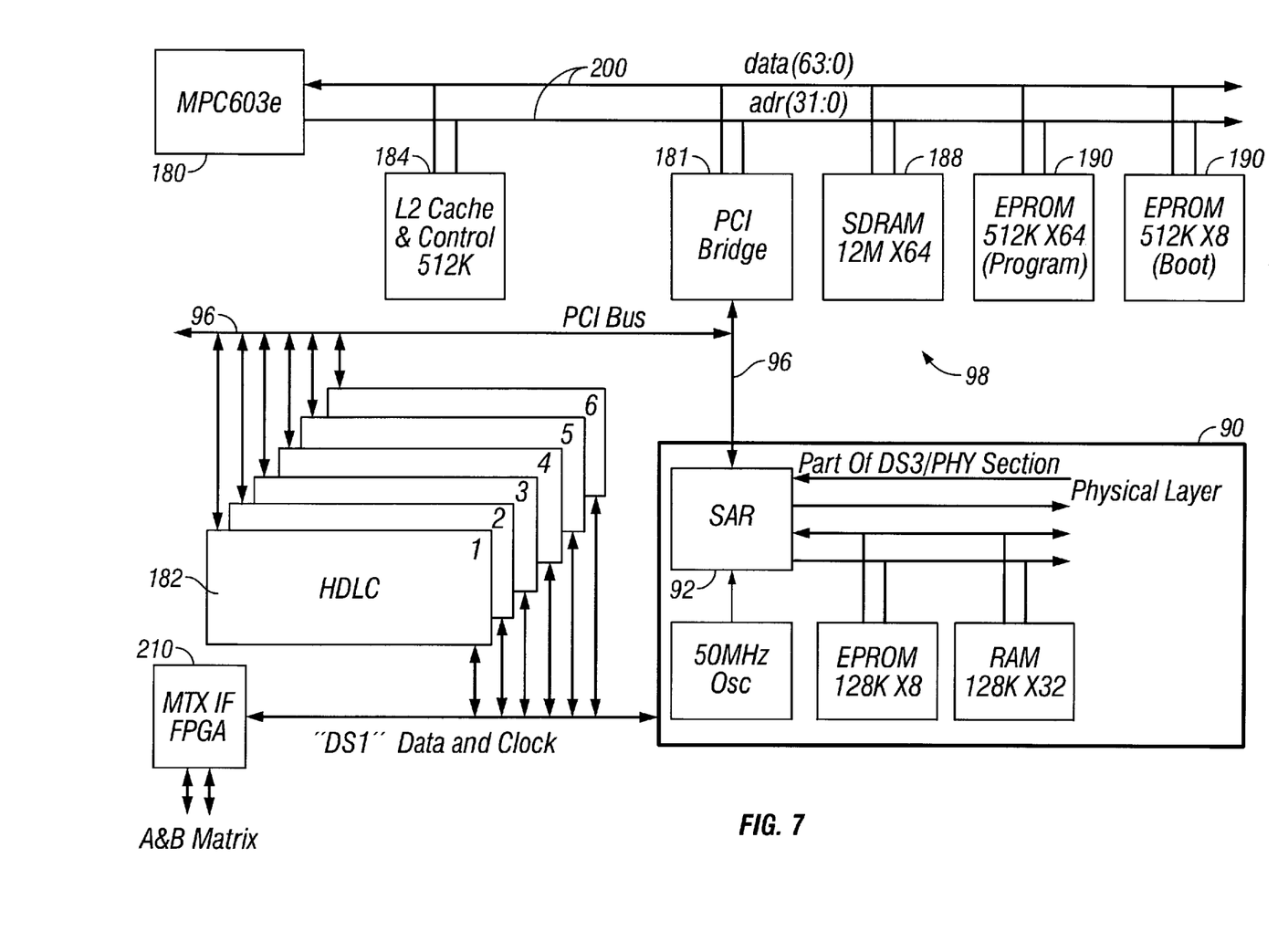
FIG. 7 is a block diagram of the present frame engine block and physical layer interface block shown in FIGS. 5a–5d.

Referring simultaneously to FIGS. 5d and 7, frame engine block 98 includes a processor 180 such as, for example, a MPC603e microprocessor manufactured and sold by Motorola, Inc. Frame engine 98 is connected to SAR 92, 6 HDLC controllers 182, and control block 102 via PCI bus 96. The PCI system memory, accessible by any PCI agent is also located within frame engine 98. The frame engine 98 PCI interface acts as both a master and a target. The PCI system memory accesses must vie with local frame engine bus accesses. In relation to the control processor block 102, frame engine 98 is viewed as a peripheral device accessed via the PCI bus 96. Firmware for frame engine 98 is resident within flash EEPROM 190 storage which is directly accessible only to frame engine 98. Frame engine 98 includes processor 180, PCI bridge memory controller 181, secondary (L2) cache module 184, system and PCI clock generator 186, synchronous DRAM memory banks 188, flash EEPROM memory banks 190, interrupt controller EPLD 192, and PCI arbitrator EPLD 194.

Frame engine interrupt controller 192 provides frame engine interrupt controller with miscellaneous physical layer and frame engine glue logic functions.

In relation to the control processor 140 (FIG. 5c) within control block 102, frame relay processor 180 is simply viewed as a peripheral device which is accessible via the PCI bus 96. Control block 102 can reset the frame relay processor 180. Processor 180 includes one external level sensitive interrupt input, and in the system level context is intended to be a mechanism for SAR 92, HDLC controllers 182, and CP to request the attention of frame engine block 98. The interrupts from each of these devices are OR'd together in frame engine interface EPLD 192. Frame engine interface EPLD 192 provides the interrupt controller, PCI arbitrator 194, and miscellaneous physical layer and frame engine glue logic functions.

Referring now to FIGS. 5a–5d and 8, matrix interface 100 converts DCS matrix data to/from frame engine PCI bus 96. In the outbound direction, the conversion process consists of reception and conversion of A and B differential RS-422 data to single ended logic levels, selection of matrix plane for network transmission, parallel to serial conversion of selected matrix plane based on TDM location of DS0 channels, grouping of each DS0 channel into DS1 like serial links, and DS0 channels which bear frame relay traffic are processed by HDLC receiver and burst across the PCI bus 96 to frame engine 98. In the inbound direction, matrix interface 100 functions to transmit data across PCI bus 96 from frame engine 98 to HDLC transmitter, serial to parallel conversion of serial DS1, channel ID is added to each of the parallel DS0 channels, and inbound data is converted into A and B RS-422 differential copies and output to the matrix via the back plane.

Circuit 24 directly interfaces to DCS 22 and interfaces with redundant (A and B) inbound and outbound matrix and timing signals. Circuit 24 selects the best matrix plane (A or B) for the outbound path under firmware control. Firmware selects the best path based on path ID and parity performance. Circuit 24 interfaces with DSC 22 matrix via the back plane. RS-422 differential receivers and transmitters are used for the interface function. In the outbound direction, the receive termination is located on the back plane. In the inbound direction, the unused bits are not driven by RS-422 drivers to reduce power consumption; instead they are tied through resistors to produce a logic "0". RS-422 driver/receiver devices are used for this interface function.

Figure 8:
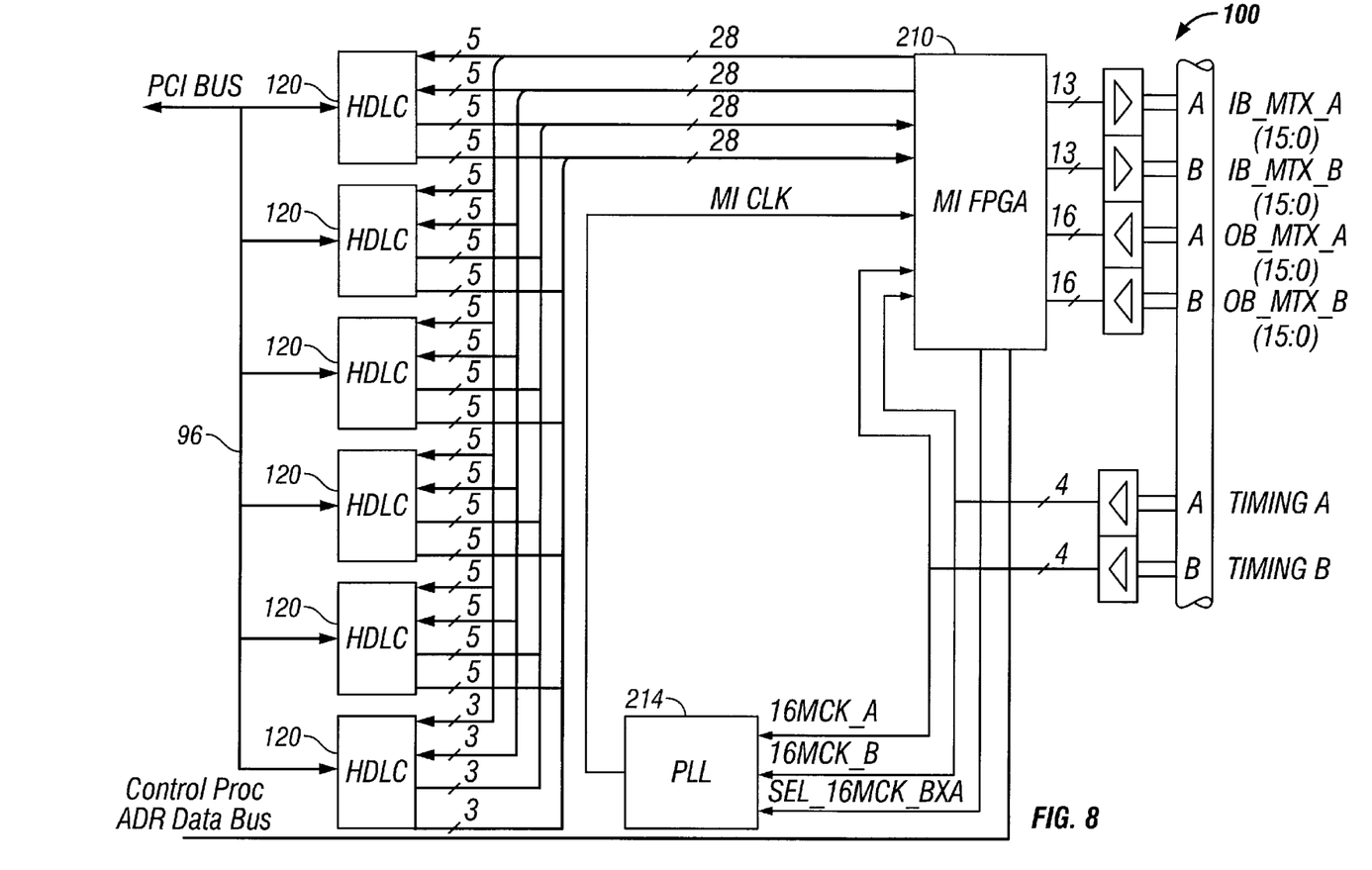
FIG. 8 is a block diagram of the matrix interface block shown in FIGS. 5a–5d.

Matrix interface 100 includes a matrix interface FPGA 210 which performs outbound matrix parallel data to serial conversion, selection of A or B outbound matrix plane, receives DS1 data lines from HDLC devices 120 and sources DS1 clock to the HDLC devices 120 in the inbound direction. FPGA 210 also monitors the A and B timing busses for failures. Timing is provided in matrix interface 100 using PLL 214.

Referring again to FIGS. 5a–5d, protection switch relay control within ATM layer 90 arbitrates circuit 24 protection pairs as to which circuit 24 is connected via relay 220 to the network DS3 line. This protection arrangement provides control over which circuit 24 is actively transmitting data to the network while allowing hardware to rapidly switch between active and standby circuits 24 in the event of a detected failure. Protection switch control hardware consists of relay 220 in the transmit DS3 paths and the control logic internal to control processor EPLD 156. Protection switch software uses the serial communication link between two circuits 24 to coordinate which of the cards is transmitting when both circuits 24 are fully functional. When both circuits 24 are fully functional, circuit path firmware controls which circuit 24 is actively transmitting to the network by a register within control processor EPLD 156 which produces the transmit relay enable to output close transmit relay 220.

Control processor EPLD 156 can automatically override the transmit enable control register bit setting if a failure condition is detected. For example, if a circuit 24 is currently active and its processor fails, control processor EPLD 156 will automatically open the transmit relay, and the control processor EPLD 156 on the companion circuit 24 will close the transmit relay. The inputs to this override logic include the local and companion card failure signals, the companion installed in the indicator and the card slot indicator. This logic provides an immediate automatic response to failure conditions.

Blocks 90, 98, 100, and 102 are all contained on a single printed circuit board or card comprising circuit 24 which is connected directly to DCS 22 including DCS 22 administrative subsystem 70. Circuit 24 represents an integrated function into DCS 22 but, instead of being a separate stand alone unit with its own independent control, circuit 24 operates internal to DCS 22. The present circuit 24 provides frame relay to ATM interworking for DS0 channels which bear frame relay traffic.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A telecommunications system, comprising:
   a digital cross-connect matrix for receiving telecommunication traffic from any of a plurality of input ports and transmitting traffic to any of a plurality of output ports;
   a frame relay circuit connected to said digital cross-connect matrix for receiving frame relay traffic signals from said digital cross-connect matrix and for converting said frame relay traffic signals to asynchronous traffic mode signals for output to said plurality of output ports, wherein said frame relay circuit comprises:
      a matrix interface connected to said digital cross-connect matrix for converting serial data from said matrix and to said matrix in a matrix data format;
      a layer interface connected to said digital cross-connect matrix for converting said frame relay traffic signals to asynchronous traffic mode signals;
      a frame engine circuit connect to said matrix interface and said layer interface for packetizing and depacketizing data; and
      a control circuit connected to said frame engine circuit, said layer interface circuit and said administrative subsystem; and
   an administrative subsystem for controlling said digital cross-connect matrix and said frame relay circuit.

2. The telecommunications system of claim 1 wherein said matrix interface, layer interface, frame engine circuit and control circuit are disposed on a single printed circuit board.

3. The telecommunications system of claim 1 wherein said matrix interface, layer interface, frame engine circuit and control circuit are interconnected via a PCI bus.

4. The telecommunications system of claim 1 wherein said frame relay circuit includes a pair of fame relay circuits to provide redundancy for said digital cross-connect matrix.

5. The telecommunications system of claim 1 wherein said digital cross-connect matrix comprises a narrow band cross-connect matrix.

6. The telecommunications system of claim 1 wherein said digital cross-connect matrix comprises a broad band cross-connect matrix.

7. A telecommunications system, comprising:
   a first digital cross-connect matrix;
   a second digital cross-connect matrix;
   a first active frame relay circuit and a second standby frame relay circuit, wherein both frame relay circuits are connected to both the first and second digital cross-connect matrices for receiving frame relay traffic signals from said first and second digital cross-connect matrices and for convening said frame relay traffic signals to asynchronous traffic mode signals for output to a network, wherein the frame relay traffic signals from either said fit or second digital cross-connect matrix is selected for conversion by each of the frame relay circuits; and
   a protection switch control that can enable either the active frame relay circuit or standby frame relay circuit to actively transmit data to the network.

8. The telecommunications system of claim 7, wherein each of the first active and second standby frame relay circuits comprises:
   a control processor for controlling the functions of the frame relay circuit; and
   a matrix interface connected to the control processor and the first and second digital cross-connect matrices that selects the frame relay traffic signals from the first digital cross-connect matrix or the second digital cross-connect matrix in response to a control signal from the control processor.

9. The telecommunications system of claim 8, wherein the protection switch control comprises:
   a control processor that coordinates which of the two frame relay circuits are actively transmitting in response to any failure conditions and transmits a control signal to enable active transmission by one of the two fame relay circuits.

* * * * *